(12) United States Patent
Katagiri et al.

(10) Patent No.: US 8,576,307 B2
(45) Date of Patent: Nov. 5, 2013

(54) IMAGING DEVICE HAVING A CHARACTERISTIC CONVERTING SECTION

(75) Inventors: Tetsuya Katagiri, Kyoto (JP); Koichi Kamon, Otokuni-gun (JP)

(73) Assignee: Konica Minolta Opto, Inc., Tokyo (JP)

( * ) Notice: Subject to any disclaimer, the term of this patent is extended or adjusted under 35 U.S.C. 154(b) by 370 days.

(21) Appl. No.: 13/055,562

(22) PCT Filed: Jul. 21, 2009

(86) PCT No.: PCT/JP2009/063058
§ 371 (c)(1),
(2), (4) Date: Jan. 24, 2011

(87) PCT Pub. No.: WO2010/010871
PCT Pub. Date: Jan. 28, 2010

(65) Prior Publication Data
US 2011/0122282 A1    May 26, 2011

(30) Foreign Application Priority Data
Jul. 25, 2008   (JP) .................................. 2008-192486

(51) Int. Cl.
*H04N 17/00* (2006.01)
*H04N 5/217* (2011.01)

(52) U.S. Cl.
USPC .......................................... 348/241; 348/187

(58) Field of Classification Search
USPC ............ 348/187, 188, 222.1, 229.1, 241, 254
See application file for complete search history.

(56) References Cited

U.S. PATENT DOCUMENTS

| 6,191,408 B1* | 2/2001 | Shinotsuka et al. ....... 250/208.1 |
| 7,920,193 B2* | 4/2011 | Ladd et al. .................... 348/308 |
| 2007/0216957 A1 | 9/2007 | Kamon et al. ................ 358/296 |
| 2009/0251571 A1 | 10/2009 | Takayama .................... 348/241 |

FOREIGN PATENT DOCUMENTS

| EP | 2 028 846 A1 | 2/2009 |
| JP | 2004-229257 A | 8/2004 |
| JP | 2006-14117 A | 1/2006 |
| JP | 2007-151016 A | 6/2007 |
| JP | 2007-251898 A | 9/2007 |
| JP | 2007-329655 A | 12/2007 |
| WO | WO 2007/145099 A1 | 12/2007 |
| WO | WO 2010/010871 A1 | 1/2010 |

* cited by examiner

*Primary Examiner* — Timothy J Henn
(74) *Attorney, Agent, or Firm* — Cozen O'Connor

(57) ABSTRACT

To convert a pixel value obtained from a non-reference photoelectric conversion characteristic into a pixel value obtained from a reference photoelectric conversion characteristic without variation, and to prevent generation of fixed pattern noise in an image. An image sensor 3 is constituted of pixels having photoelectric conversion characteristics, in which a linear characteristic is on the low luminance side with respect to an inflection point, and a logarithmic characteristic is on the high luminance side with respect to the inflection point. A conversion information storage 68 stores, as conversion information, coefficients "c", "d", "e", and "f" of two kinds of linear functions ($y = c \cdot \log(x) + d$, and $y = e \cdot \log(x) + f$), which are approximation equations expressing the logarithmic characteristic of each of the pixels, where y designates a pixel value, and x designates a luminance value of incident light. A linear converter 64 converts a pixel value obtained from the logarithmic characteristic into a pixel value obtained from the linear characteristic by using the approximation equations specified by the coefficients.

7 Claims, 9 Drawing Sheets

IMAGING DEVICE HAVING A CHARACTERISTIC CONVERTING SECTION

This is a U.S. National Stage under 35 U.S.C. §371 of International Application No. PCT/JP2009/063058, filed in the Japanese Patent Office on Jul. 21, 2009, which claims priority on Japanese Patent Application No. 2008-192486, filed on Jul. 25, 2008.

TECHNICAL FIELD

The invention relates to an imaging device provided with an imaging element constituted of a plurality of pixels having different photoelectric conversion characteristics with respect to an inflection point.

BACKGROUND ART

In recent years, there has been known an imaging element constituted of a plurality of pixels having different photoelectric conversion characteristics with respect to an inflection point, for instance, an imaging element having a linear photoelectric conversion characteristic (hereinafter, called as a linear characteristic) on the low luminance side with respect to an inflection point, and a logarithmic photoelectric conversion characteristic (hereinafter, called as a logarithmic characteristic) on the high luminance side with respect to the inflection point. A photoelectric conversion characteristic composed of a linear characteristic and a logarithmic characteristic is called as a linear-logarithmic characteristic.

In an imaging device provided with an imaging element having the above arrangement, a pixel value obtained from a logarithmic characteristic is converted into a pixel value obtained from a linear characteristic.

However, since there is a range having a transient photoelectric conversion characteristic composed of a linear characteristic and a logarithmic characteristic in a boundary between the linear characteristic and the logarithmic characteristic, if the entire range corresponding to a logarithmic characteristic is converted into a linear characteristic, a pixel value obtained from the transient photoelectric conversion characteristic may not be precisely converted into a pixel value obtained from the linear characteristic.

In view of the above, patent literature 1 discloses an imaging device for converting a pixel value obtained from a linear characteristic and a logarithmic characteristic, and a pixel value obtained from a transient photoelectric conversion characteristic into a pixel value obtained from a reference photoelectric conversion characteristic.

In an imaging element, there is known that a logarithmic characteristic greatly varies in each of the pixels. FIG. 13 is a graph showing linear-logarithmic characteristics, wherein the axis of ordinate designates a pixel value, and the axis of abscissas designates a luminance in terms of log. FIG. 14 is a graph showing linear characteristics obtained by converting the logarithmic characteristics shown in FIG. 13 into the linear characteristics, wherein the axis of ordinate designates a pixel value, and the axis of abscissas designates a luminance in terms of log.

As shown in FIG. 13, plotting the linear-logarithmic characteristic of each of the pixels on a graph shows that variation is small in the linear characteristics. On the other hand, observing the logarithmic characteristics, it is clear that the logarithmic characteristics of the respective pixels indicated by the solid lines do not coincide with a predicted logarithmic characteristic common to all the pixels, as indicated by the dotted line, and greatly vary.

However, the imaging device disclosed in patent literature 1 is configured to convert a pixel value obtained from a logarithmic characteristic into a pixel value obtained from a linear characteristic by using an approximation equation expressing a logarithmic characteristic common to all the pixels, without considering variation in logarithmic characteristic with respect to each of the pixels.

As a result, as shown in FIG. 14, a linear characteristic of each of the pixels after the conversion does not coincide with a linear characteristic to be converted, which makes it impossible to convert a pixel value obtained from a logarithmic characteristic into a pixel value obtained from a linear characteristic without variation. As a result, fixed pattern noise may be generated in an image.

An object of the invention is to provide an imaging device that enables to convert a pixel value obtained from a non-reference photoelectric conversion characteristic into a pixel value obtained from a reference photoelectric conversion characteristic without variation, and enables to prevent generation of fixed pattern noise in an image.

CITATION LIST

Patent Literature

Patent literature 1: JP 2007-251898A

SUMMARY OF INVENTION

An imaging device according to an aspect of the invention includes an imaging element constituted of a plurality of pixels having different photoelectric conversion characteristics with respect to an inflection point; and assuming that one of the different photoelectric conversion characteristics is a reference photoelectric conversion characteristic, and the other thereof is a non-reference photoelectric conversion characteristic, a characteristic converting section which converts a pixel value obtained from the non-reference photoelectric conversion characteristic into a pixel value obtained from the reference photoelectric conversion characteristic. In the above arrangement, the characteristic converting section converts the pixel value obtained from the non-reference photoelectric conversion characteristic into the pixel value obtained from the reference photoelectric conversion characteristic by using predetermined conversion information with respect to each of the pixels to eliminate variation of the reference photoelectric conversion characteristic of each of the pixels after the conversion, the variation of the reference photoelectric conversion characteristic resulting from variation of the non-reference photoelectric conversion characteristic of each of the pixels.

DESCRIPTION OF EMBODIMENTS

First Embodiment

Figure 1:
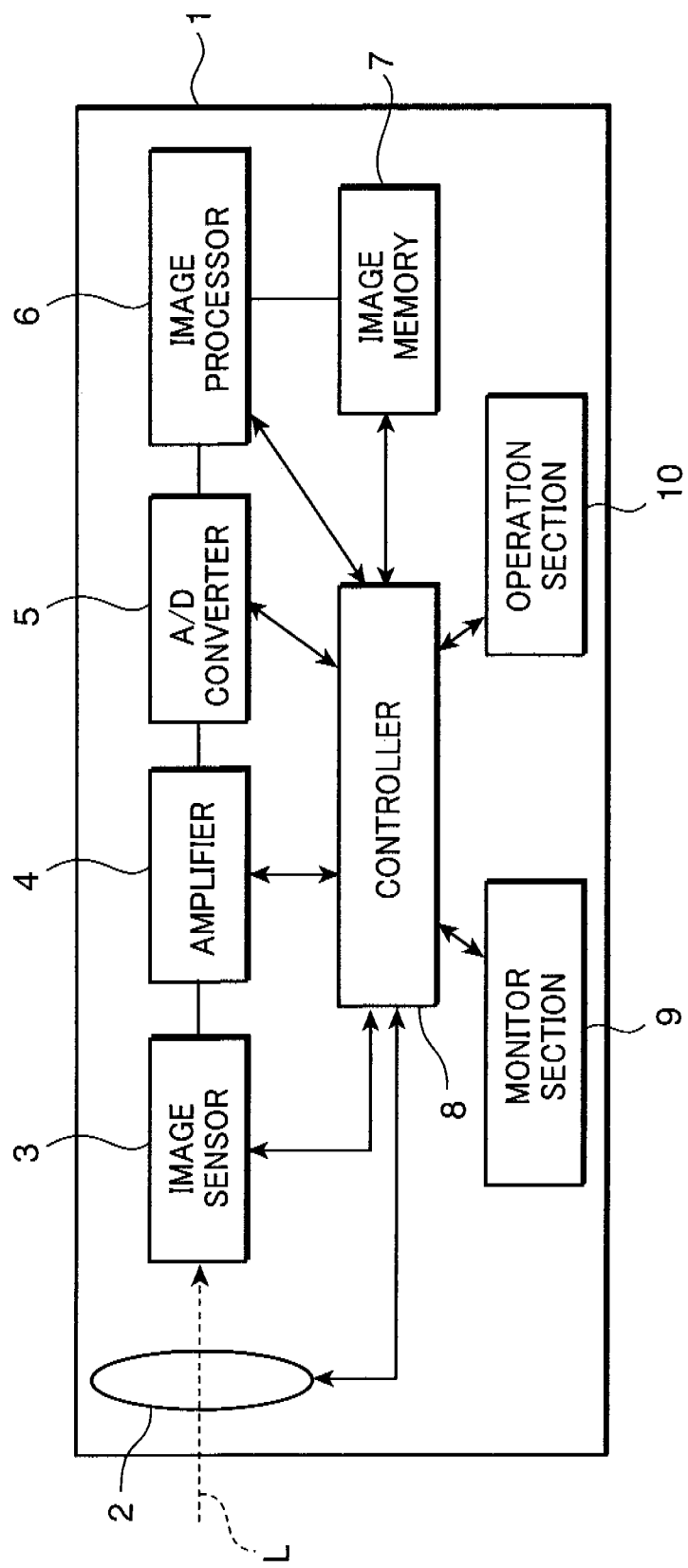
FIG. 1 is a block diagram showing an imaging device in a first embodiment of the invention.

FIG. 1 is a block diagram showing an imaging device in accordance with the first embodiment of the invention. As shown in FIG. 1, the imaging device is constituted of a digital camera, and is provided with a lens section 2, an image sensor 3 (example of an imaging element), an amplifier 4, an A/D converter 5, an image processor 6, an image memory 7, a controller 8, a monitor section 9, and an operation section 10.

The lens section 2 is constituted of an optical lens system for introducing a light image of a subject, and guiding the light image to the image sensor 3. Examples of the optical lens system are a zoom lens and a focus lens which are disposed in series along the optical axis L of a light image of a subject, and other fixed lens block. Further, the lens section 2 is provided with a diaphragm (not shown) for adjusting the light amount to be transmitted, and a shutter (not shown). The diaphragm and the shutter are driven under the control of the controller 8.

The image sensor 3 photoelectrically converts a light image formed in the lens section 2, generates image data constituted of pixel values of the respective color components of R (red), G (green), and B (blue) each having a level depending on a received light amount, and outputs the image data to the amplifier 4. An image sensor such as a CMOS image sensor, VMIS (Threshold Voltage Modulation Image Sensor) image sensor, or a CCD image sensor may be used as the image sensor 3. In this embodiment, an image sensor provided with pixels of the respective color components in a Bayer matrix is used as the image sensor 3.

The amplifier 4 includes e.g. an AGC (auto gain control) circuit and a CDS (correlated double sampling) circuit, and amplifies image data outputted from the image sensor 3. The A/D converter 5 converts image data of the respective colors of R, G, and B that has been amplified by the amplifier 4 into digital image data of the respective colors of R, G, and B. In this embodiment, image data received on the respective pixels of the image sensor 3 is converted into image data having gradation values of e.g. 12 bits.

The image processor 6 performs an image processing to be described later. The image memory 7 is constituted of e.g. an RAM (Random Access Memory), and stores e.g. image data subjected to the image processing by the image processor 6.

The controller 8 is constituted of an ROM for storing various control programs, an RAM for temporarily storing data, and a central processing unit (CPU) for reading out e.g. a control program from the ROM to execute the control program. The controller 8 controls overall operations of the imaging device.

The monitor section 9 is e.g. a color liquid crystal display device which is disposed on the back surface of a housing of the imaging device. The monitor section 9 displays e.g. an image captured by the image sensor 3, or an image stored in the image memory 7.

The operation section 10 includes various operation switch groups such as a power source switch, a release switch, a mode setting switch for setting various photography modes, and a menu selection switch. When the release switch is pressed, an imaging operation, in other words, a series of photographing operations including capturing an image of a subject by the image sensor 3, applying a predetermined image processing with respect to image data obtained by the image capturing operation, and recording the image data into e.g. the image memory 7 are performed. Alternatively, a series of imaging operations may be ended by outputting image data from the image processor 6 as a digital signal, or outputting image data as an analog signal such as an NTSC signal by D/A conversion, without storing the image data into e.g. the image memory 7.

Figure 2:
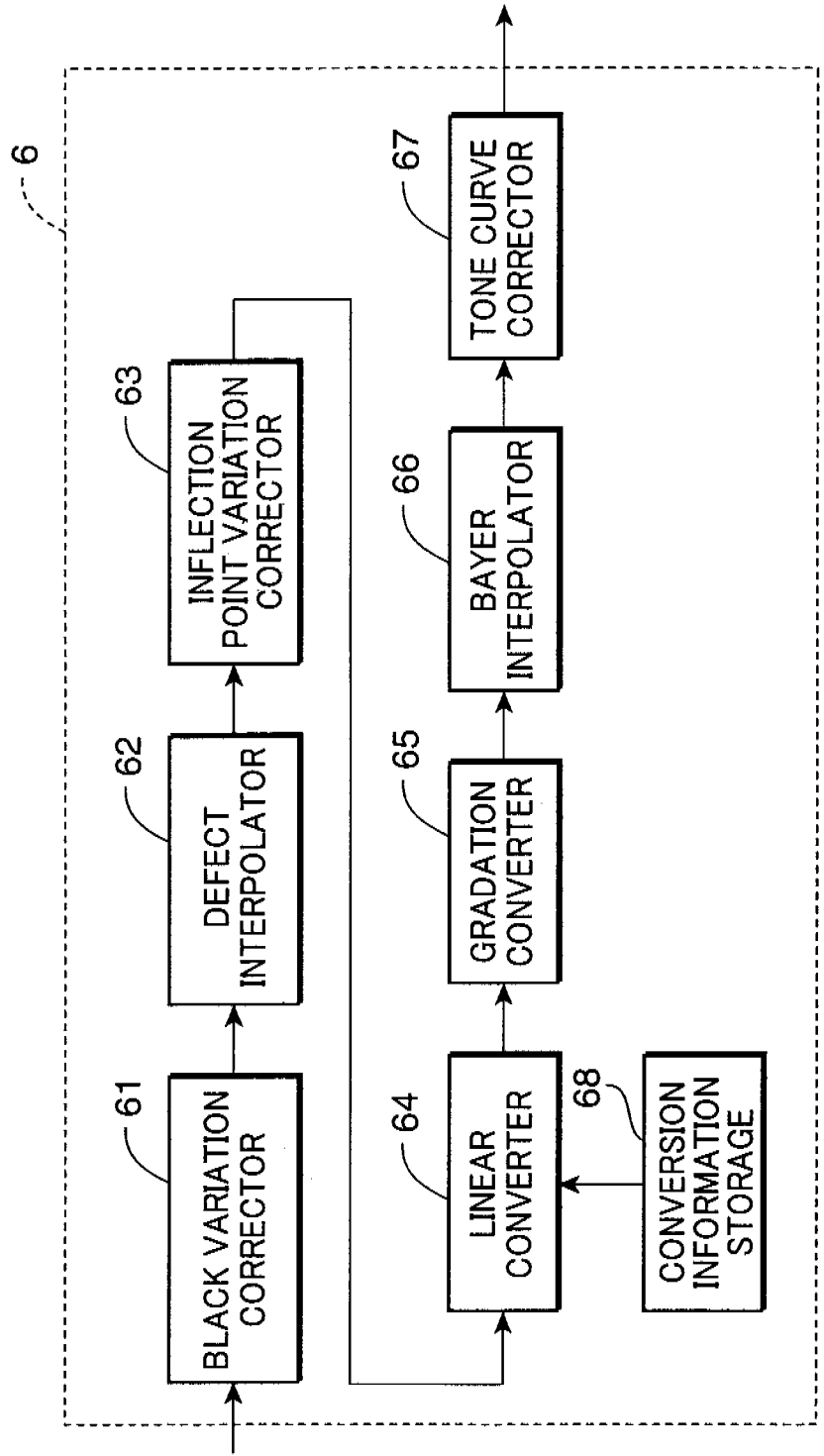
FIG. 2 is a block diagram showing an image processor shown in FIG. 1.

FIG. 2 is a block diagram showing the image processor 6 shown in FIG. 1. The image processor 6 is provided with a black variation corrector 61, a defect interpolator 62, an inflection point variation corrector 63, a linear converter 64 (example of a characteristic converting section), a gradation converter 65, a Bayer interpolator 66, a tone curve corrector 67, and a conversion information storage 68.

The black variation corrector 61 corrects variation of the black level of each of the pixels constituting the image sensor 3. The defect interpolator 62 performs an interpolation processing with respect to a pixel value of a defect pixel from which only a pixel level equal to or smaller than a predetermined reference value is obtained, by using pixel values of pixels in the vicinity of the defect pixel. In this embodiment, linear interpolation or spline interpolation may be used as the interpolation processing.

The inflection point variation corrector 63 corrects variation of the inflection point of a photoelectric conversion characteristic in each of the pixels. In this embodiment, as shown in FIG. 3, a linear-logarithmic sensor having a linear-logarithmic characteristic as a photoelectric conversion characteristic is used, wherein each of the pixels constituting the image sensor 3 has a linear characteristic on the low luminance side with respect to an inflection point P1, and has a logarithmic characteristic on the high luminance side with respect to the inflection point P1.

The inflection point P1 varies in each of the pixels. In view of this, the inflection point variation corrector 63 performs a processing of correcting variation of the inflection point P1. Specifically, the inflection point variation corrector 63 corrects variation of the inflection point P1 by correcting the pixel value of each of the pixels by using a predetermined correction coefficient for use in correcting a photoelectric conversion characteristic of each of the pixels in such a manner that the inflection point of each of the pixels coincides with a predetermined reference inflection point.

The linear converter 64 converts a pixel value obtained from a logarithmic characteristic (example of a non-reference photoelectric conversion characteristic) into a pixel value obtained from a linear characteristic (example of a reference photoelectric conversion characteristic). In this arrangement, the linear converter 64 calculates an approximation equation expressing a logarithmic characteristic of each of the pixels by using predetermined conversion information with respect to each of the pixels to convert a pixel value obtained from a logarithmic characteristic into a pixel value obtained from a linear characteristic by using the calculated approximation equation. In this embodiment, a coefficient of an approximation equation expressing a logarithmic characteristic of each of the pixels is used as the conversion information. Then, the linear converter 64 converts a pixel value obtained from a logarithmic characteristic into a pixel obtained from a linear characteristic by using an approximation equation specified by the coefficient of the approximation equation expressing the logarithmic characteristic of each of the pixels.

Figure 3:
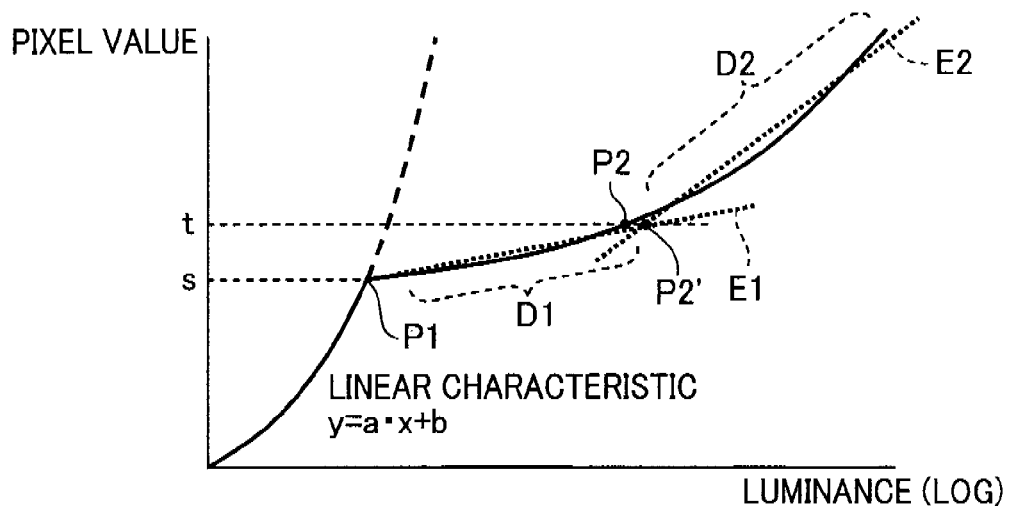
FIG. 3 is a graph showing photoelectric conversion characteristics of an image sensor in the first embodiment of the invention.

In the above arrangement, the pixel value obtained from the logarithmic characteristic means a pixel value belonging to a logarithmic characteristic range constituted of a logarithmic characteristic range D1 and a logarithmic characteristic range D2 on the high luminance side with respect to the inflection point P1, as shown in FIG. 3. Further, the pixel value obtained from the linear characteristic means a pixel value belonging to a linear characteristic range on the low luminance side with respect to the inflection point P1.

The conversion information storage 68 shown in FIG. 2 stores e.g. conversion information. The gradation converter 65 performs a dynamic range compression processing for compressing the dynamic range of one frame of image data constituted of pixel values outputted from the linear converter 64. In this embodiment, the gradation converter 65 performs the dynamic range compression processing by applying a digital filter processing with respect to one frame of image data constituted of pixel values outputted from the linear converter 64, with use of a low-pass filter having a matrix of a predetermined row by a predetermined column; separating the image data into an illumination component and a reflectance component; compressing the illumination component in such a manner that the dynamic range of the illumination component has a predetermined compression characteristic; and multiplying the compressed illumination component with the reflectance component.

The Bayer interpolator 66 performs a Bayer interpolation, which is an interpolation processing for interpolating a defect pixel of each of the color components, resulting from the construction that the pixels constituting the image sensor 3 has a Bayer matrix. In the case where the image sensor 3 is a monochromatic image sensor, the Bayer interpolator 66 may be omitted. The tone curve corrector 67 gamma-corrects the image data outputted from the Bayer interpolator 66.

FIG. 3 is a graph showing photoelectric conversion characteristics of the image sensor 3 in this embodiment, wherein the axis of ordinate designates a pixel value, and the axis of abscissas designates a luminance of incident light in terms of log. In the following, a processing to be performed by the linear converter 64 is described referring to FIG. 3. In this arrangement, the linear converter 64 approximates a logarithmic characteristic of each of the pixels by using two approximation equations E1 and E2, which are two linear functions. The approximation equation E1 is an equation obtained by approximating a logarithmic characteristic on the low luminance side with respect to an inflection point P2 with a linear function, and the approximation equation E2 is an equation obtained by approximating a logarithmic characteristic on the high luminance side with respect to the inflection point P2 with a linear function.

Further, a range where the photoelectric conversion characteristic is expressed by a linear characteristic is called as a linear characteristic range, a range where the photoelectric conversion characteristic is expressed by the approximation equation E1 is called as a logarithmic characteristic range D1, and a range where the photoelectric conversion characteristic is expressed by the approximation equation E2 is called as a logarithmic characteristic range D2.

The approximation equation E1 is expressed by: $y = c \cdot \log(x) + d$, and the approximation equation E2 is expressed by: $y = e \cdot \log(x) + f$. Further, the linear characteristic is expressed by: $y = a \cdot x + b$. In the equations, "y" designates a pixel value, "x" designates a luminance, and "a", "b", "c", "d", "e", and "f" each designates a coefficient.

Referring to FIG. 3, "s" designates a pixel value at the inflection point P1, and "t" designates a pixel value at an intersection P2' of the approximation equation E1 and the approximation equation E2.

Since the logarithmic characteristic varies greatly in each of the pixels, the coefficients "c", "d", "e", and "f" in the approximation equations E1 and E2 also vary in each of the pixels. In view of this, in this embodiment, the coefficients "c", "d", "e", and "f" for each of the pixels are obtained in advance by an experiment, and these coefficients are stored in advance in the conversion information storage 68.

Since the linear characteristic does not greatly vary in each of the pixels, the coefficients "a" and "b" common to all the pixels are obtained in advance by an experiment, and these coefficients are stored in advance in the conversion information storage 68. Further, the pixel values "s" and "t" are obtained in advance by an experiment, as pixel values common to all the pixels, and these pixel values are stored in advance in the conversion information storage 68.

Then, the linear converter 64 performs the following processing:

if ($v \leq s$)

$$v' = v \qquad (1)$$

else if ($v \leq t$)

$$v' = \exp((v-d)/c) \cdot a + b \qquad (2)$$

else $$v' = \exp((v-f)/e) \cdot a + b \qquad (3)$$

where v designates the pixel value of a certain pixel, and v' designates a pixel value after the processing.

Specifically, the linear converter 64 performs the processing expressed by the equation (1), in the case where "v" is $v \leq s$, in other words, in the case where "v" is a pixel value obtained from a linear characteristic.

Further, the linear converter 64 performs the processing expressed by the equation (2), in the case where "v" is $s \leq v \leq t$, in other words, in the case where "v" is a pixel value obtained from the logarithmic characteristic range D1.

Further, the linear converter 64 performs the processing expressed by the equation (3), in the case where "v" is $v > t$, in other words, in the case where "v" is a pixel value obtained from the logarithmic characteristic range D2. The equation (2) is yielded by solving the approximation equation E1 with respect to "x", and substituting the solution in the equation: $y = a \cdot x + b$; and the equation (3) is yielded by solving the approximation equation E2 with respect to "x", and substituting the solution in the equation: $y = a \cdot x + b$.

Next, an operation to be performed by the imaging device in this embodiment is described. Firstly, upon accepting an imaging request from the user through the operation section 10, image data captured by the image sensor 3 is amplified to a predetermined level by the amplifier 4, the amplified image data is subjected to A/D conversion by the A/D converter 5, and the digital image data is inputted to the image processor 6.

The image data inputted to the image processor 6 is subjected to black level correction by the black variation corrector 61, a defect pixel is subjected to interpolation by the defect interpolator 62, and variation of the inflection point is corrected by the inflection point variation corrector 63. Thereafter, the image data is inputted to the linear converter 64.

The image data inputted to the linear converter 64 is subjected to a processing, wherein the pixel whose pixel value "v" satisfies v≤s is processed by the equation (1), the pixel whose pixel value "v" satisfies v≤t is processed by the equation (2), and the pixel whose pixel value "v" satisfies v>t is processed by the equation (3).

The image data processed by the linear converter 64 is subjected to dynamic range compression by the gradation converter 65, subjected to Bayer interpolation by the Bayer interpolator 66, subjected to gamma correction by the tone curve corrector 67, and then stored in the image memory 7.

In the imaging device of this embodiment, since a pixel value obtained from a logarithmic characteristic is converted into a pixel value obtained from a linear characteristic by using the approximation equations E1 and E2 specified by the predetermined coefficients "a" through "e" with respect to each of the pixels, the pixel value obtained from the logarithmic characteristic can be converted into the pixel value obtained from the linear characteristic without variation. Thus, it is possible to suppress generation of fixed pattern noise in an image.

In this embodiment, two logarithmic characteristics are approximated by the two approximation equations E1 and E2. Alternatively, a logarithmic characteristic may be approximated by a single approximation equation, or may be approximated by three or more approximation equations. In the modification, coefficients of the respective approximation equations for each of the pixels may be obtained in advance by an experiment, and the coefficients may be stored in advance in the conversion information storage 68. Then, the linear converter 64 may specify an approximation equation corresponding to the pixel value of each of the pixels to convert a pixel value obtained from a logarithmic characteristic into a pixel value obtained from a linear characteristic by using the specified approximation equation.

In this embodiment, a logarithmic characteristic is used as a non-reference photoelectric conversion characteristic, and a logarithmic characteristic is used as a reference photoelectric conversion characteristic. Alternatively, a linear characteristic may be used as a non-reference photoelectric conversion characteristic, and a logarithmic characteristic may be used as a reference photoelectric conversion characteristic. The above modifications may also be applied to the following embodiments.

Second Embodiment

An imaging device in accordance with the second embodiment has a feature that a quadratic function is used as an approximation equation expressing a logarithmic characteristic. Description on the elements substantially equivalent or identical to those of the first embodiment is omitted herein.

In this embodiment, a linear converter 64 converts a pixel value obtained from a logarithmic characteristic into a pixel value obtained from a linear characteristic by using an approximation equation E3 obtained by approximating a logarithmic characteristic of each of the pixels with a quadratic function. Further, coefficients of the approximation equation E3 for each of the pixels are used as conversion information.

Figure 4:
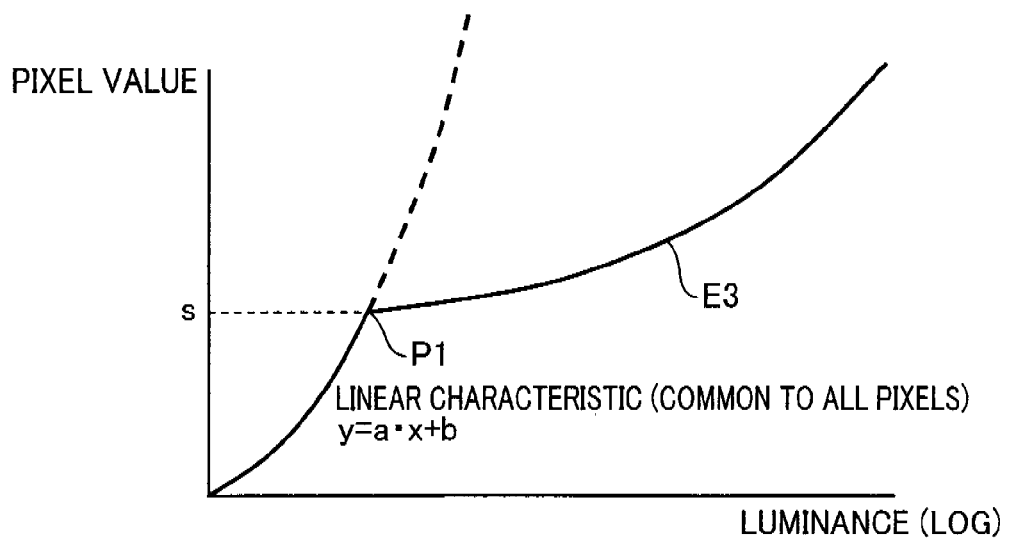
FIG. 4 is a graph showing photoelectric conversion characteristics of an image sensor in a second embodiment of the invention.

FIG. 4 is a graph showing photoelectric conversion characteristics of an image sensor 3 in this embodiment, wherein the axis of ordinate designates a pixel value, and the axis of abscissas designates a luminance in terms of log.

In the following, a processing to be performed by a linear converter 64 is described referring to FIG. 4. The approximation equation E3 is expressed by: $y = g \cdot (\log(x))^2 + h \cdot \log(x) + i$, where y designates a pixel value, x designates a luminance, and g, h, and i each designates a coefficient.

Since a logarithmic characteristic varies greatly in each of the pixels, the coefficients "g", "h", and "i" in the approximation equation E3 also vary in each of the pixels. In view of this, in this embodiment, the coefficients "g", "h", and "i" for each of the pixels are obtained in advance by an experiment, and these coefficients are stored in advance in a conversion information storage 68.

Then, the linear converter 64 performs the following processing:

if (v≤s)

$$v' = v \qquad (4)$$

else $$v' = \exp((-h + (h^2 - 4 \cdot g \cdot i)^{1/2})/2 \cdot g) \cdot a + b \qquad (5)$$

Specifically, the linear converter 64 performs the processing expressed by the equation (4), in the case where the pixel value "v" is v≤s, in other words, in the case where "v" is a pixel value obtained from a linear characteristic.

Further, the linear converter 64 performs the processing expressed by the equation (5), in the case where the pixel value "v" is v>s, in other words, in the case where "v" is a pixel value obtained from a logarithmic characteristic. The equation (5) is yielded by solving the approximation equation E3 with respect to "x", and substituting the solution in the equation: $y = a \cdot x + b$.

Thus, in the imaging device of this embodiment, a pixel value obtained from a logarithmic characteristic is converted into a pixel value obtained from a linear characteristic by using a quadratic function obtained by approximating a logarithmic characteristic of each of the pixels with precision. Accordingly, it is possible to convert a pixel value obtained from a logarithmic characteristic into a pixel value obtained from a linear characteristic without variation, thereby preventing generation of fixed pattern noise in an image.

Third Embodiment

An imaging device in accordance with the third embodiment has a feature that a pixel value obtained from a logarithmic characteristic is converted into a pixel value obtained from a linear characteristic by using plural lookup tables. Description on the elements substantially equivalent or identical to those of the first and second embodiments is omitted herein.

Figure 5:
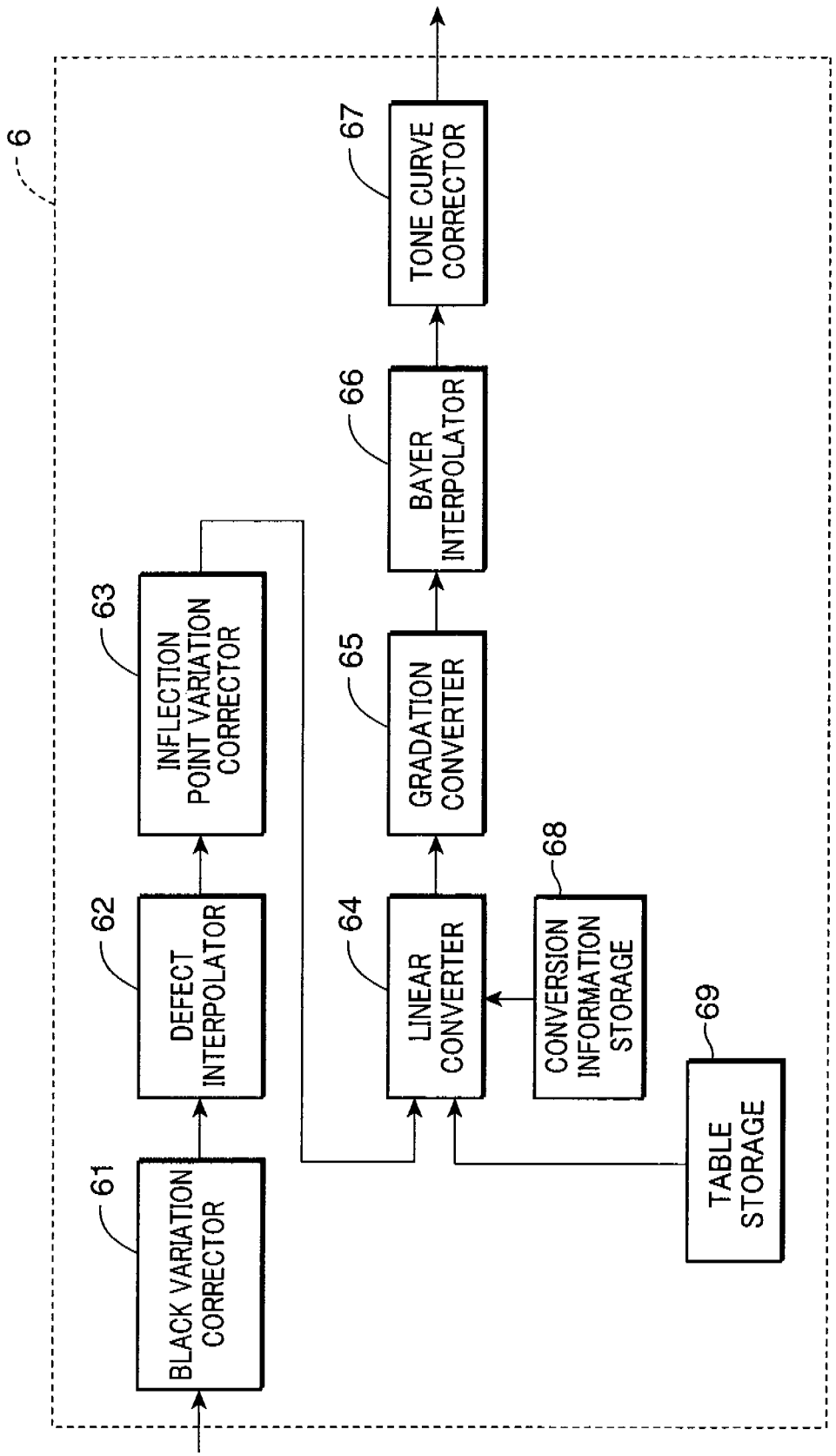
FIG. 5 is a block diagram showing an image processor in a third embodiment of the invention.

FIG. 5 is a block diagram showing an image processor 6 in this embodiment. As shown in FIG. 5, the image processor 6 is provided with a table storage 69. The table storage 69 stores "n" (where n is an integer of 2 or larger) lookup tables LUT1 through LUTn for use in correcting a logarithmic characteristic of each of the pixels into a predetermined logarithmic characteristic common to all the pixels.

In this embodiment, conversion information is information for use in selecting a most preferable lookup table, from among a plurality of lookup tables, in correcting a logarithmic characteristic of each of the pixels to a predicted logarithmic characteristic common to all the pixels. Specifically, conversion information is e.g. information for allowing a certain pixel "α" to select a lookup table LUT2, and allowing a certain pixel "β" to select a lookup table LUT5.

Further, in this embodiment, a linear converter 64 selects one lookup table from among the lookup tables LUT1 through LUTn by using the conversion information, and corrects a pixel value obtained from a logarithmic characteristic by using the selected lookup table to convert the corrected pixel value into a pixel value obtained from a linear characteristic.

Figure 6:
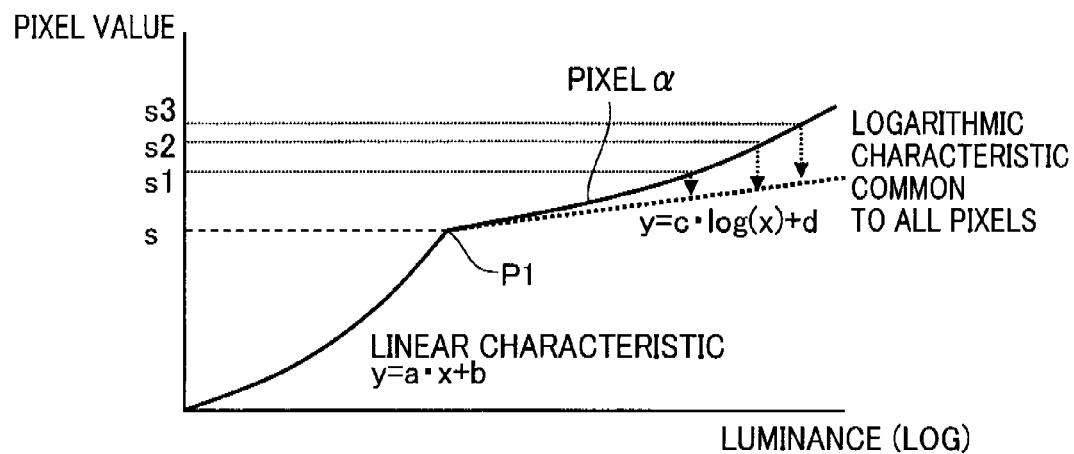
FIG. 6 is a graph showing photoelectric conversion characteristics of an image sensor in the third embodiment of the invention.

FIG. 6 is a graph showing photoelectric conversion characteristics of an image sensor 3 in this embodiment, wherein the axis of ordinate designates a pixel value, and the axis of abscissas designates a luminance of incident light in terms of log. In the following, a processing to be performed by the linear converter 64 is described referring to FIG. 6.

In FIG. 6, the solid line designates a logarithmic characteristic of a certain pixel "α", and the dotted line designates a logarithmic characteristic common to all the pixels. The logarithmic characteristic common to all the pixels is approximated by e.g. a linear function, and is expressed by: $y = c \cdot \log(x) + d$, where y designates a pixel value, x designates a luminance, and c and d each designates a predetermined coefficient.

The linear converter 64 selects a lookup table correlated to the pixel "α" from the conversion information, and inputs a pixel value obtained from a logarithmic characteristic into the selected lookup table. Then, the inputted pixel value is corrected into a pixel value obtained from the logarithmic characteristic common to all the pixels, as indicated by the dotted line in FIG. 6.

Specifically, the linear converter 64 performs the following processing:

if (v≤s)

$$v' = v \quad (6)$$

else $$v' = \exp((\text{LUT}i(v) - d)/c) \cdot a + b \quad (7)$$

where i in LUTi(v) designates the number for specifying a lookup table, and i=1 through n.

Specifically, the linear converter 64 performs the processing expressed by the equation (6), in the case where the pixel value "v" is v≤s, in other words, in the case where "v" is a pixel value obtained from a linear characteristic.

Further, the linear converter 64 performs the processing expressed by the equation (7), in the case where the pixel value "v" is v>s, in other words, in the case where "v" is a pixel value obtained from a logarithmic characteristic. The equation (7) is yielded by solving the equation: $y = \text{LUT}i(v) = c \cdot \log(x) + d$, which is an approximation equation expressing the logarithmic characteristic common to all the pixels, with respect to "x", and substituting the solution in the equation: $y = a \cdot x + b$.

Since a logarithmic characteristic varies greatly in each of the pixels, it is possible to securely correct a pixel value into a pixel value obtained from a logarithmic characteristic common to all the pixels by preparing in advance lookup tables corresponding to the respective pixels, and by correcting a pixel value obtained from a logarithmic characteristic by using the respective lookup tables.

However, storing the lookup tables corresponding to the respective pixels in the table storage 69 increases the memory capacity of the table storage 69, which is not desirable. In view of the above, in this embodiment, "n" lookup tables LUT1 through LUTn as representative lookup tables are prepared in advance. Then, conversion information is configured to correlate the respective pixels to the lookup tables LUT1 through LUTn so that a logarithmic characteristic of each of the pixels is corrected into the logarithmic characteristic common to all the pixels with most approximation. This enables to suppress variation of a logarithmic characteristic of each of the pixels to thereby convert a pixel value obtained from a logarithmic characteristic into a pixel value obtained from a linear characteristic. The value "n" is set smaller than the pixel number of the image sensor 3.

Figure 7:
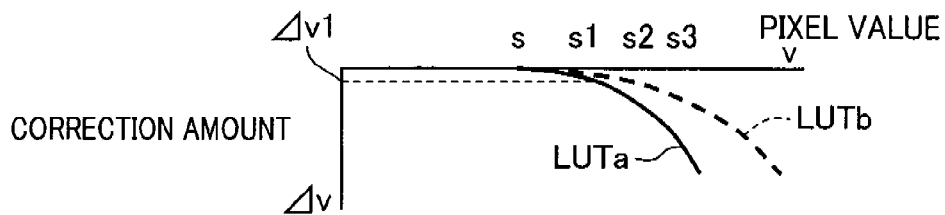
FIG. 7 is a graph showing a relation between a pixel value and a correction amount in certain two lookup tables.

FIG. 7 is graphs showing a relation between a pixel value and a correction amount in certain two lookup tables, wherein the axis of ordinate designates a correction amount Δv, and the axis of abscissas designates a pixel value. In FIG. 7, the solid line designates a correction amount in a lookup table LUTa, and the dotted line designates a correction amount in a lookup table LUTb. The correction amount Δv is a value which is obtained in advance by an experiment, based on a relation between a logarithmic characteristic of each of the pixels, and a logarithmic characteristic common to all the pixels. In the case where the correction amount Δv is added to an original pixel value, the value becomes a plus value; and in the case where the correction amount Δv is subtracted from an original pixel value, the value becomes a minus value.

As described above, a certain pixel is correlated to e.g. the lookup table LUTa based on the conversion information, and the linear converter 64 inputs "s1" into the lookup table LUTa in response to input of the pixel value of "s1". Then, the summation result (s1+Δv1) is outputted from the lookup table LUTa, and correction is performed so that the pixel value is used for a photoelectric conversion characteristic common to all the pixels. Then, the linear converter 64 calculates "v'" by substituting the summation result (s1+Δv1) in LUTi(v) in the equation (7), and converts "s1" into a pixel value obtained from a linear characteristic.

As described above, in the imaging device of this embodiment, it is possible to convert a pixel value obtained from a logarithmic characteristic into a pixel value obtained from a linear characteristic without variation, with no need of preparing lookup tables for the respective pixels, thereby reducing the capacity of a memory for storing lookup tables.

Fourth Embodiment

An imaging device in accordance with the fourth embodiment has a feature that a pixel value obtained from a logarithmic characteristic is converted into a pixel value obtained from a linear characteristic by using one lookup table. Description on the elements substantially equivalent or identical to those of the first through third embodiments is omitted herein.

The block diagram of an image processor 6 in this embodiment is the same as the block diagram of FIG. 5. A table storage 69 stores one lookup table for use in correcting a logarithmic characteristic of each of the pixels into a predetermined logarithmic characteristic common to all the pixels.

In this embodiment, conversion information is a change value for use in changing a lookup table into lookup tables for the respective pixels in order to change a pixel value obtained from a logarithmic characteristic into a logarithmic characteristic common to all the pixels. Specifically, assuming that a lookup table stored in the table storage 69 is LUTo(v), and lookup tables for the respective pixels are LUTi(v), a change value Ki is given by LUTo(v·Ki)=LUTi(v), where i is the number for specifying a pixel. Specifically, the change value Ki is a value depending on each of the pixels. Further, the change value Ki is a value obtained in advance by an experiment.

A linear converter 64 converts a pixel value obtained from a logarithmic characteristic into a pixel value obtained from a linear characteristic by using a lookup table LUTi(v·Ki) which has been changed by using the change value Ki.

Specifically, the linear converter 64 performs the following processing.

if (v≤s)

$$v'=v \quad (8)$$

else $$v'=\exp((\text{LUT}o(v\cdot Ki)-d)/c)\cdot a+b \quad (9)$$

Specifically, the linear converter 64 performs the processing expressed by the equation (8), in the case where the pixel value "v" is v≤s, in other words, in the case where "v" is a pixel value obtained from a linear characteristic.

Further, the linear converter 64 performs the processing expressed by the equation (9), in the case where the pixel value "v" is s<v, in other words, in the case where "v" is a pixel value obtained from a logarithmic characteristic.

As described above, in the imaging device of this embodiment, since a pixel value obtained from a logarithmic characteristic can be converted into a pixel value obtained from a reference photoelectric conversion characteristic without variation only by preparing a single lookup table LUTo(x), with no need of preparing lookup tables for the respective pixels. This enables to reduce the memory capacity of the table storage 69.

Fifth Embodiment

Figure 8:
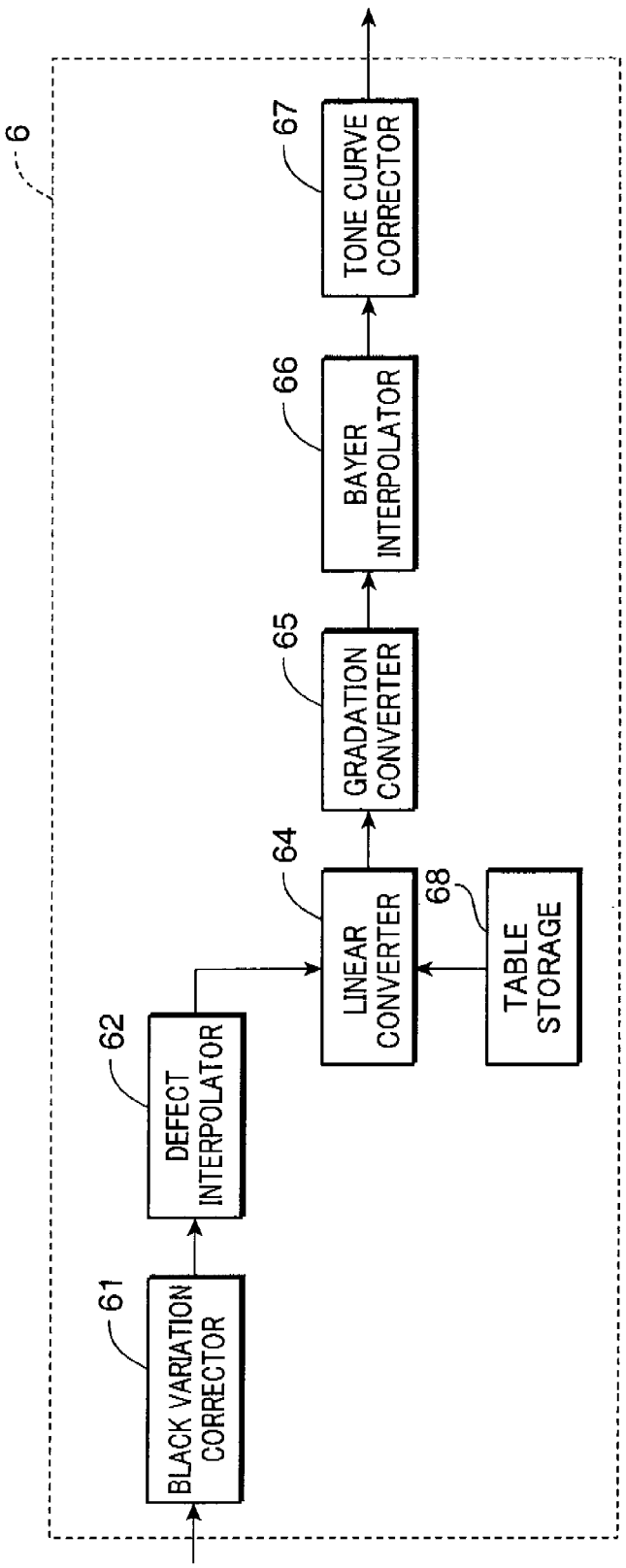
FIG. 8 is a block diagram showing an image processor in a fifth embodiment of the invention.

An imaging device in accordance with the fifth embodiment has a feature that an approximation equation expressing a logarithmic characteristic of each of the pixels is obtained, based on an inflection point for each of the pixels to convert a pixel value obtained from a logarithmic characteristic into a pixel value obtained from a linear characteristic by using the obtained approximation equation. Description on the elements substantially equivalent or identical to those of the first through fourth embodiments is omitted herein. FIG. 8 is a block diagram showing an image processor 6 in the fifth embodiment. As shown in FIG. 8, in the fifth embodiment, since variation of an inflection point is used, an inflection point variation corrector 63 is omitted.

Further, in this embodiment, a predetermined coefficient calculation function is used as conversion information to determine a coefficient of an approximation equation expressing a logarithmic characteristic, based on an inflection point for each of the pixels.

A linear converter 64 calculates a coefficient of an approximation equation for each of the pixels by using a coefficient calculation function, based on an inflection point for each of the pixels to convert a pixel value obtained from a logarithmic characteristic into a pixel value obtained from a linear characteristic by using an approximation equation specified by the calculated coefficient. In the above arrangement, the following equation (10) may be adopted as an approximation equation expressing a logarithmic characteristic. In the equation (10), "g", "h", and "i" are each a coefficient of the approximation equation.

$$y=g\cdot(\log(x))^2+h\cdot\log(x)+i \quad (10)$$

Figure 9:
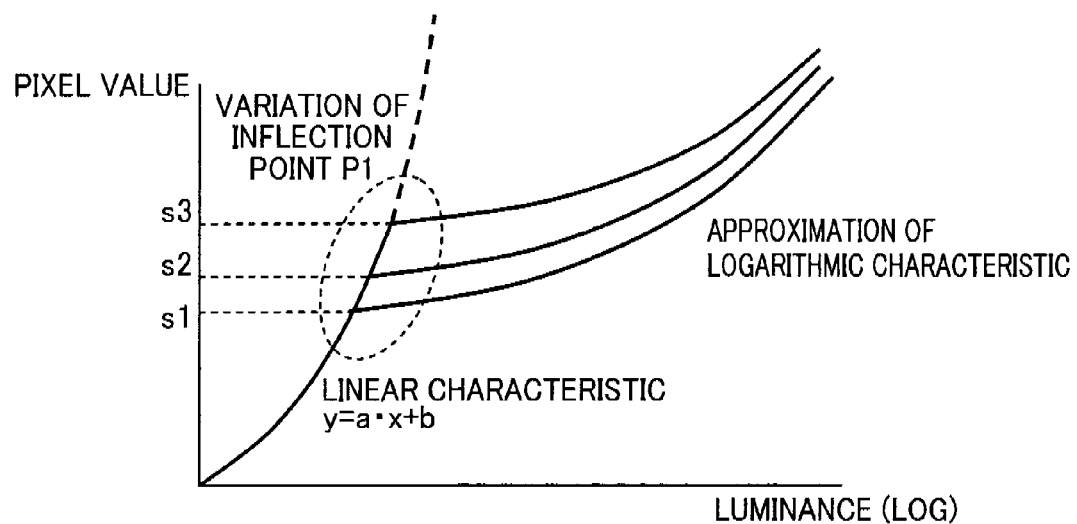
FIG. 9 is a graph showing photoelectric conversion characteristics of an image sensor in the fifth embodiment of the invention.

FIG. 9 is a graph showing photoelectric conversion characteristics of an image sensor 3 in this embodiment, wherein the axis of ordinate designates a pixel value, and the axis of abscissas designates a luminance. As shown in FIG. 9, the logarithmic characteristic of each of the pixels varies, and the inflection point P1 also varies. In the graph, the variation of the logarithmic characteristic is changed depending on the pixel value "s" (where s is one of s1 through s3) at the inflection point.

Figure 10:
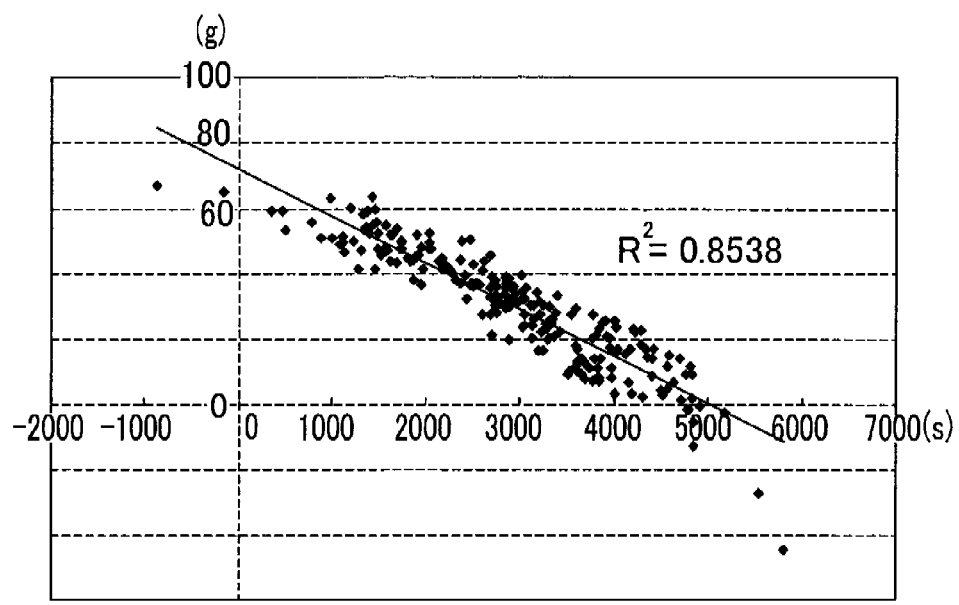
FIG. 10 is a graph showing a relation between a coefficient "g" and a pixel value at an inflection point.
Figure 11:
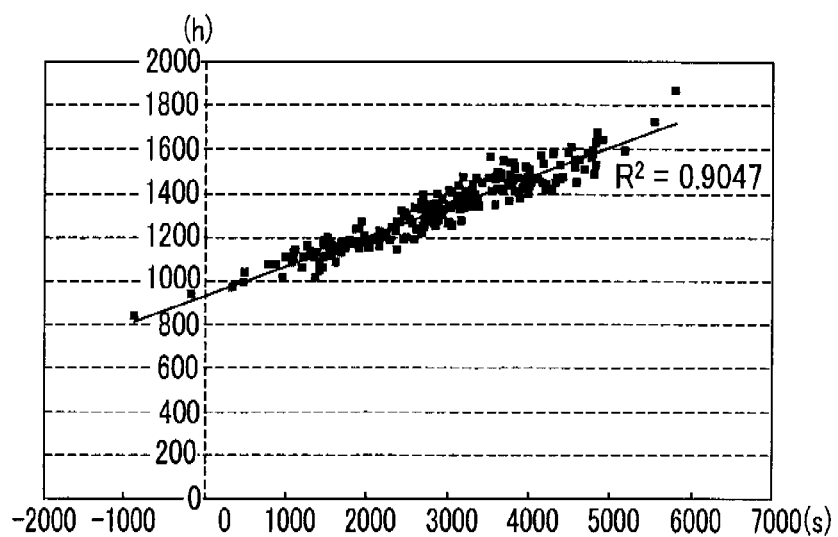
FIG. 11 is a graph showing a relation between a coefficient "h" and a pixel value at an inflection point.
Figure 12:
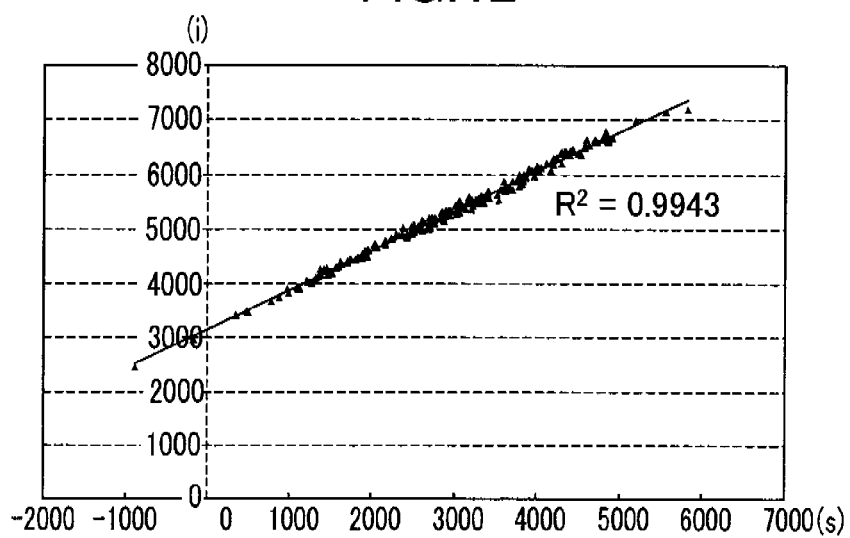
FIG. 12 is a graph showing a relation between a coefficient "i" and a pixel value at an inflection point.
Figure 13:
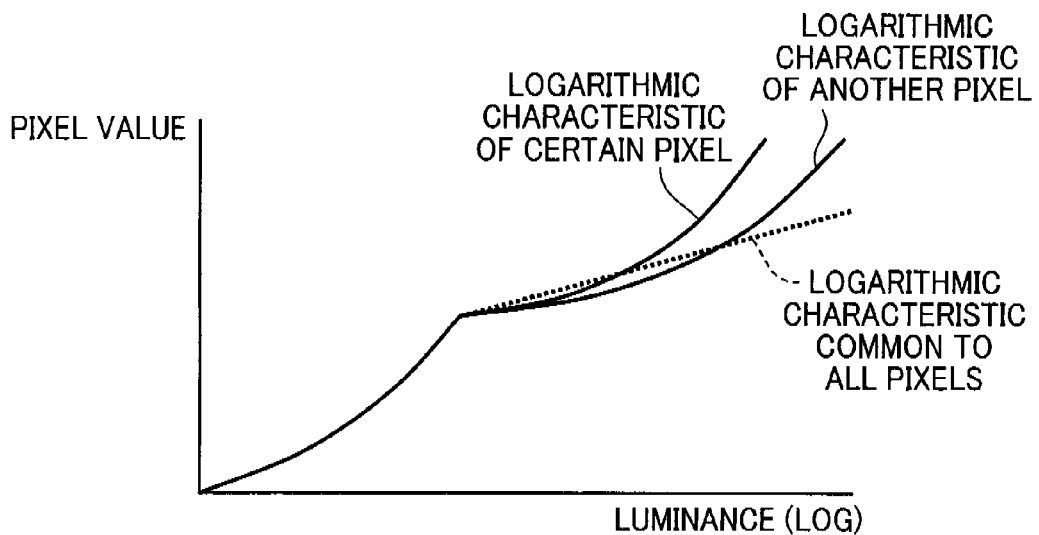
FIG. 13 is a graph showing linear-logarithmic characteristics.
Figure 14:
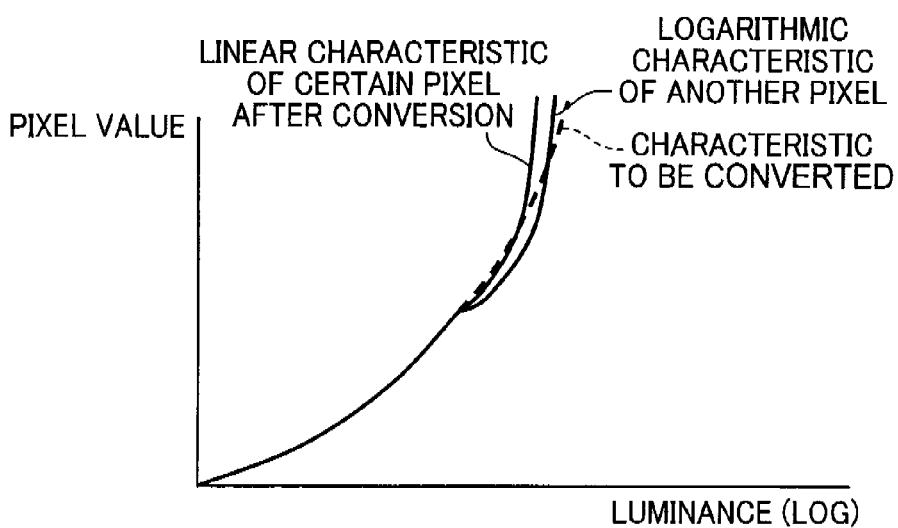
FIG. 14 is a graph showing linear characteristics obtained by converting the logarithmic characteristics shown in FIG. 13 into the linear characteristics.

FIGS. 10 through 12 are graphs respectively showing a relation between the coefficient "g" and the pixel value "s" at the inflection point, a relation between the coefficient "h" and the pixel value "s" at the inflection point, and a relation between the coefficient "i" and the pixel value "s" at the inflection point. In FIGS. 10 through 12, the axes of ordinate respectively indicate the values of the coefficients "g", "h", and "i", and the axes of abscissas respectively indicate the pixel value "s" at the inflection point. The plotted dots in FIGS. 10 through 12 indicate measurement results on the relations between the pixel value "s" at the inflection point, and the coefficients "g", "h", and "i" for each of the pixels. As shown in FIGS. 10 through 12, the coefficients "g", "h", and "i" are each generally linearly changed with respect to the pixel value "s" at the inflection point. Thus, it is concluded that the coefficients "g", "h", and "i", and the pixel value "s" at the inflection point are correlated to each other. In FIGS. 10 through 12, the correlation coefficient is 0.8 or more. Accordingly, it is possible to approximate the relation between the coefficients "g", "h", and "i", and the pixel value "s" at the inflection point with a linear function, as shown by the equations (11) through (13).

$$g=j\cdot s+k \quad (11)$$

$$h=1\cdot s+m \quad (12)$$

$$i=n\cdot s+o \quad (13)$$

In view of the above, in this embodiment, the equations (11) through (13) are calculated in advance as coefficient calculation functions, based on the measurement results shown in FIGS. 10 through 12, and are stored in a conversion information storage 68. Specifically, coefficients "j", "k", "l", "m", "n", and "o" in the equations (11) through (13) are stored in the conversion information storage 68. Further, inflection points for the respective pixels are obtained in advance by an experiment, and are stored in the conversion information storage 68.

Then, a linear converter 64 substitutes the pixel value "s" of each of the pixels at the inflection point in the equations (11) through (13), reads out the coefficients "j", "k", "l", "m", "n", and "o" from the conversion information storage 68, and substitutes the readout coefficients "j", "k", "l", "m", "n", and "o" in the equations (11) through (13) to compute the coefficients "g", "h", and "i". Then, the linear converter 64 obtains an approximation equation expressing a logarithmic characteristic by substituting the computed coefficients "g", "h", and "i" in the equation (10) to convert a pixel value obtained from a logarithmic characteristic into a pixel value obtained from a linear characteristic by using the approximation equation.

Specifically, the linear converter 64 performs the following processing.

if (v≤s)
  v'=v
else {
  g=j · s+k

-continued

```
        h=l·s+m
        i=n·s+o
        v'=exp((−h+(h²−4·g·i)^(1/2))/2·g)·a+b
    }
``` where the equations in the first through fourth line in the else bracket are respectively the equations (11) through (13), and (5).

In the case where v≤s, in other words, in the case where "v" is a pixel value obtained from a linear characteristic, the linear converter 64 performs the equation: v'=v. On the other hand, in the case where v≤s, in other words, in the case where "v" is a pixel value obtained from a logarithmic characteristic, the linear converter 64 performs the equations (10) through (13).

As described above, in the imaging device of this embodiment, a coefficient of an approximation equation for each of the pixels is calculated, based on the pixel value "s" of each of the pixels at the inflection point to convert a pixel value obtained from a logarithmic characteristic into a pixel value obtained from a linear characteristic by using an approximation equation specified by the calculated coefficient. This enables to convert the target pixel value into a pixel value obtained from the linear characteristic without variation.

In this embodiment, the quadratic function expressed by the equation (10) is used as an approximation equation expressing a logarithmic characteristic. Alternatively, a linear function may be used, in place of the quadratic function. In the modification, coefficients of a coefficient calculation function representing a relation between the coefficients of the respective linear functions, and a pixel value at an inflection point are obtained in advance, and are stored in the conversion information storage 68.

In the first through the fifth embodiments, linear functions or a quadratic function is used as an approximation equation expressing a logarithmic characteristic. Alternatively, a function of a higher order such as a cubic function or a quartic function may be used. The modification is advantageous in approximating a logarithmic characteristic with enhanced precision. In the modification, however, since the number of coefficients to be stored in the conversion information storage 68 is increased, it is preferable to use linear functions or a quadratic function.

The following is a summary of the technical features of the embodiments.

(1) The aforementioned imaging device includes an imaging element constituted of a plurality of pixels having different photoelectric conversion characteristics with respect to an inflection point; and assuming that one of the different photoelectric conversion characteristics is a reference photoelectric conversion characteristic, and the other thereof is a non-reference photoelectric conversion characteristic, a characteristic converting section which converts a pixel value obtained from the non-reference photoelectric conversion characteristic into a pixel value obtained from the reference photoelectric conversion characteristic. In the above arrangement, the characteristic converting section converts the pixel value obtained from the non-reference photoelectric conversion characteristic into the pixel value obtained from the reference photoelectric conversion characteristic by using predetermined conversion information with respect to each of the pixels to eliminate variation of the reference photoelectric conversion characteristic of each of the pixels after the conversion, the variation of the reference photoelectric conversion characteristic resulting from variation of the non-reference photoelectric conversion characteristic of each of the pixels.

With the above arrangement, the pixel value obtained from the non-reference photoelectric conversion characteristic is converted into the pixel value obtained from the reference photoelectric conversion characteristic by using the predetermined conversion information with respect to each of the pixels to eliminate variation of the reference photoelectric conversion characteristic of each of the pixels after the conversion, which results from variation of the non-reference photoelectric conversion characteristic of each of the pixels. This enables to convert the pixel value obtained from the non-reference photoelectric conversion characteristic into the pixel value obtained from the reference photoelectric conversion characteristic without variation to thereby prevent generation of fixed pattern image in an image.

(2) In the imaging device, preferably, the characteristic converting section may calculate an approximation equation expressing the non-reference photoelectric conversion characteristic of each of the pixels by using the conversion information to convert the pixel value obtained from the non-reference photoelectric conversion characteristic into the pixel value obtained from the reference photoelectric conversion characteristic by using the calculated approximation equation.

With the above arrangement, an approximation equation expressing the non-reference photoelectric conversion characteristic of each of the pixels is calculated by using the conversion information to convert the pixel value obtained from the non-reference photoelectric conversion characteristic into the pixel value obtained from the reference photoelectric conversion characteristic by using the calculated approximation equation. This is more advantageous in converting the pixel value obtained from the non-reference photoelectric conversion characteristic into the pixel value obtained from the reference photoelectric conversion characteristic without variation.

(3) In the imaging device, preferably, the conversion information may be a coefficient of the approximation equation which is predefined with respect to each of the pixels, and the characteristic converting section may convert the pixel value obtained from the non-reference photoelectric conversion characteristic into the pixel value obtained from the reference photoelectric conversion characteristic by using the approximation equation specified by the coefficient.

With the above arrangement, since the pixel value obtained from the non-reference photoelectric conversion characteristic is converted into the pixel value obtained from the reference photoelectric conversion characteristic only by storing the coefficient of the predetermined approximation equation with respect to each of the pixels, it is possible to reduce the capacity of a memory.

(4) In the imaging device, preferably, the approximation equation may be obtained by approximating the non-reference photoelectric conversion characteristic with two kinds of linear functions, and the conversion information may be coefficients of the respective linear functions.

With the above arrangement, since the non-reference photoelectric conversion characteristic is approximated with two kinds of linear functions, it is possible to precisely approximate the non-reference photoelectric conversion characteristic of each of the pixels.

(5) In the imaging device, preferably, the approximation equation may be obtained by approximating the non-reference photoelectric conversion characteristic with a quadratic function, and the conversion information may be coefficients of the quadratic function.

With the above arrangement, since the non-reference photoelectric conversion characteristic is approximated with a quadratic function, it is possible to precisely approximate the non-reference photoelectric conversion characteristic of each of the pixels.

(6) Preferably, the imaging device may further include a table storage which stores a correction table for use in correcting the non-reference photoelectric conversion characteristic of each of the pixels into a predicted non-reference photoelectric conversion characteristic common to all the pixels, wherein the characteristic converting section corrects the pixel value obtained from the non-reference photoelectric conversion characteristic by using the conversion information and the correction table to convert the corrected pixel value into the pixel value obtained from the reference photoelectric conversion characteristic.

With the above arrangement, after the non-reference photoelectric conversion characteristic of each of the pixels is corrected into the predicted non-reference photoelectric conversion characteristic common to all the pixels, the pixel value obtained from the non-reference photoelectric conversion characteristic is converted into the pixel value obtained from the reference photoelectric conversion characteristic. This enables to convert the target pixel value into the pixel value obtained from the reference photoelectric conversion characteristic without variation.

(7) In the imaging device, preferably, the correction table may be a plurality of correction tables, the conversion information may be information for use in selecting a most preferable correction table, from among the plurality of the correction tables, in correcting the non-reference photoelectric conversion characteristic of each of the pixels into the non-reference photoelectric conversion characteristic common to all the pixels, and the characteristic converting section may select one correction table from among the plurality of the correction tables by using the conversion information, and corrects the pixel value obtained from the non-reference photoelectric conversion characteristic by using the selected correction table to convert the corrected pixel value into the pixel value obtained from the reference photoelectric conversion characteristic.

With the above arrangement, since it is possible to convert the pixel value obtained from the non-reference photoelectric conversion characteristic into the pixel value obtained from the reference photoelectric conversion characteristic without variation, with no need of preparing correction tables for the respective pixels, it is possible to reduce the capacity of a memory for storing correction tables.

(8) In the imaging device, preferably, the correction table may be a single correction table, the conversion information may be a change value for use in changing the correction table into correction tables for the respective pixels to change the pixel value obtained from the non-reference photoelectric conversion characteristic into the pixel value obtained from the non-reference photoelectric conversion characteristic common to all the pixels, and the characteristic converting section may convert the pixel value obtained from the non-reference photoelectric conversion characteristic into the pixel value obtained from the reference photoelectric conversion characteristic by using the respective correction tables changed by using the change value.

With the above arrangement, since it is possible to convert the pixel value obtained from the non-reference photoelectric conversion characteristic into the pixel value obtained from the reference photoelectric conversion characteristic without variation only by preparing a single correction table, with no need of preparing correction tables for the respective pixels, it is possible to reduce the capacity of a memory for storing correction tables.

(9) In the imaging device, preferably, the conversion information may be a predetermined coefficient calculation function for use in determining a coefficient of the approximation equation expressing the non-reference photoelectric conversion characteristic, based on the inflection point for each of the pixels, and the characteristic converting section may calculate the coefficient of the approximation equation with respect to each of the pixels by using the coefficient calculation function, based on the inflection point for each of the pixels to convert the pixel value obtained from the non-reference photoelectric conversion characteristic into the pixel value obtained from the reference photoelectric conversion characteristic by using the approximation equation specified by the calculated coefficient.

With the above arrangement, the coefficient of the approximation equation for each of the pixels is calculated, based on the inflection point for each of the pixels, and the pixel value obtained form the non-reference photoelectric conversion characteristic is converted into the pixel value obtained from the reference photoelectric conversion characteristic by using the approximation equation specified by the calculated coefficient. This enables to convert the pixel value obtained from the non-reference photoelectric conversion characteristic into the pixel value obtained from the reference photoelectric conversion characteristic without variation.

(10) In the imaging device, preferably, the reference photoelectric conversion characteristic may be a linear photoelectric conversion characteristic, and the non-reference photoelectric conversion characteristic may be a logarithmic photoelectric conversion characteristic.

With the above arrangement, the pixel value obtained from the logarithmic photoelectric conversion characteristic can be converted into the pixel value obtained from the linear photoelectric conversion characteristic without variation.

The invention claimed is:

1. An imaging device comprising:
   an imaging element constituted of a plurality of pixels having different photoelectric conversion characteristics with respect to an inflection point; and
   assuming that one of the different photoelectric conversion characteristics is a reference photoelectric conversion characteristic, and the other thereof is a non-reference photoelectric conversion characteristic, a characteristic converting section which converts a pixel value obtained from the non-reference photoelectric conversion characteristic into a pixel value obtained from the reference photoelectric conversion characteristic,
   wherein the characteristic converting section converts the pixel value obtained from the non-reference photoelectric conversion characteristic into the pixel value obtained from the reference photoelectric conversion characteristic by using predetermined conversion information with respect to each of the pixels to eliminate variation of the reference photoelectric conversion characteristic of each of the pixels after the conversion, the variation of the reference photoelectric conversion characteristic resulting from variation of the non-reference photoelectric conversion characteristic of each of the pixels,
   wherein the characteristic converting section calculates an approximation equation expressing the non-reference photoelectric conversion characteristic of each of the pixels by using the conversion information to convert the pixel value obtained from the non-reference photoelectric conversion characteristic into the pixel value obtained from the reference photoelectric conversion characteristic by using the calculated approximation equation, wherein the approximation equation is obtained by approximating the non-reference photoelectric conversion characteristic with a quadratic function, and wherein the conversion information is coefficients of the quadratic function.

2. The imaging device according to claim 1, wherein the conversion information is a predetermined coefficient calculation function for use in determining a coefficient of the approximation equation expressing the non-reference photoelectric conversion characteristic, based on the inflection point for each of the pixels, and the characteristic converting section calculates the coefficient of the approximation equation with respect to each of the pixels by using the coefficient calculation function, based on the inflection point for each of the pixels to convert the pixel value obtained from the non-reference photoelectric conversion characteristic into the pixel value obtained from the reference photoelectric conversion characteristic by using the approximation equation specified by the calculated coefficient.

3. The imaging device according to claim 1, wherein the reference photoelectric conversion characteristic is a linear photoelectric conversion characteristic, and the non-reference photoelectric conversion characteristic is a logarithmic photoelectric conversion characteristic.

4. An imaging device comprising:

an imaging element constituted of a plurality of pixels having different photoelectric conversion characteristics with respect to an inflection point; and assuming that one of the different photoelectric conversion characteristics is a reference photoelectric conversion characteristic, and the other thereof is a non-reference photoelectric conversion characteristic, a characteristic converting section which converts a pixel value obtained from the non-reference photoelectric conversion characteristic into a pixel value obtained from the reference photoelectric conversion characteristic, wherein the characteristic converting section converts the pixel value obtained from the non-reference photoelectric conversion characteristic into the pixel value obtained from the reference photoelectric conversion characteristic by using predetermined conversion information with respect to each of the pixels to eliminate variation of the reference photoelectric conversion characteristic of each of the pixels after the conversion, the variation of the reference photoelectric conversion characteristic resulting from variation of the non-reference photoelectric conversion characteristic of each of the pixels, a table storage which stores a correction table for use in correcting the non-reference photoelectric conversion characteristic of each of the pixels into a predicted non-reference photoelectric conversion characteristic common to all the pixels, wherein the characteristic converting section corrects the pixel value obtained from the non-reference photoelectric conversion characteristic by using the conversion information and the correction table to convert the corrected pixel value into the pixel value obtained from the reference photoelectric conversion characteristic, the correction table is a plurality of correction tables, the conversion information is information for use in selecting a most preferable correction table, from among the plurality of the correction tables, in correcting the non-reference photoelectric conversion characteristic of each of the pixels into the non-reference photoelectric conversion characteristic common to all the pixels, and the characteristic converting section selects one correction table from among the plurality of the correction tables by using the conversion information, and corrects the pixel value obtained from the non-reference photoelectric conversion characteristic by using the selected correction table to convert the corrected pixel value into the pixel value obtained from the reference photoelectric conversion characteristic.

5. The imaging device according to claim 4, wherein the reference photoelectric conversion characteristic is a linear photoelectric conversion characteristic, and the non-reference photoelectric conversion characteristic is a logarithmic photoelectric conversion characteristic.

6. An imaging device comprising:

an imaging element constituted of a plurality of pixels having different photoelectric conversion characteristics with respect to an inflection point; and assuming that one of the different photoelectric conversion characteristics is a reference photoelectric conversion characteristic, and the other thereof is a non-reference photoelectric conversion characteristic, a characteristic converting section which converts a pixel value obtained from the non-reference photoelectric conversion characteristic into a pixel value obtained from the reference photoelectric conversion characteristic, wherein the characteristic converting section converts the pixel value obtained from the non-reference photoelectric conversion characteristic into the pixel value obtained from the reference photoelectric conversion characteristic by using predetermined conversion information with respect to each of the pixels to eliminate variation of the reference photoelectric conversion characteristic of each of the pixels after the conversion, the variation of the reference photoelectric conversion characteristic resulting from variation of the non-reference photoelectric conversion characteristic of each of the pixels, a table storage which stores a correction table for use in correcting the non-reference photoelectric conversion characteristic of each of the pixels into a predicted non-reference photoelectric conversion characteristic common to all the pixels, wherein the characteristic converting section corrects the pixel value obtained from the non-reference photoelectric conversion characteristic by using the conversion information and the correction table to convert the corrected pixel value into the pixel value obtained from the reference photoelectric conversion characteristic, the correction table is a single correction table, the conversion information is a change value for use in changing the correction table into correction tables for the respective pixels to change the pixel value obtained from the non-reference photoelectric conversion characteristic into the pixel value obtained from the non-reference photoelectric conversion characteristic common to all the pixels, and the characteristic converting section converts the pixel value obtained from the non-reference photoelectric conversion characteristic into the pixel value obtained from the reference photoelectric conversion characteristic by using the respective correction tables changed by using the change value.

7. The imaging device according to claim 6, wherein
the reference photoelectric conversion characteristic is a linear photoelectric conversion characteristic, and
the non-reference photoelectric conversion characteristic is a logarithmic photoelectric conversion characteristic.

\* \* \* \* \*